United States Patent Office 3,498,970
Patented Mar. 3, 1970

3,498,970
METHOD OF PREPARING 6-SUBSTITUTED-8-MERCAPTOPURINE DERIVATIVES
Yoshitaka Yamada and Moritaro Sakurai, Kawasaki-shi, and Izumi Kumashiro, Yokohama-shi, Japan, assignors to Ajinomoto Co., Inc., Tokyo, Japan
No Drawing. Filed Feb. 8, 1968, Ser. No. 703,881
Claims priority, application Japan, Feb. 18, 1967, 42/10,304
Int. Cl. C07d 57/62
U.S. Cl. 260—211.5                 8 Claims

ABSTRACT OF THE DISCLOSURE

Adenine, hypoxanthine, 6-chloropurine, 6-N-benzyladenine, 6-methoxypurine, 2-N-9(or 7)-N-diacetylguanine, the 2', 3', 5'-tri-O-acetyl-derivatives of adenosine, inosine, and guanosine, and the corresponding 2',3'-isopropylidene derivatives are readily converted to the corresponding 8-mercapto-derivatives by refluxing in acetamide or N-mono- or di-lower alkyl-acetamides with an excess of elementary sulfur.

BACKGROUND OF THE INVENTION

This invention relates to a method of preparing 8-mercaptopurine derivatives, more particularly derivatives of purine and purine nucleosides having substituents in the 6-position of the purine nucleus. Because of the reactivity of the mercapto group, the compounds obtained are useful intermediates for the synthesis of other purine derivatives in a known manner. They also react with cyanogen halides in the presence of an acid acceptor to form 8-thiocyanopurine derivatives known to have antitumor effects (Japanese published patent application No. 25910/1967).

8-mercaptopurine derivatives have been prepared heretofore by reacting 5,6-disubstituted purine derivatives with a sulfur bearing compound, such as thiourea or carbon disulfide, to close a ring (J. Am. Chem. Soc., 67, 290 (1945), Can. J. Chem., 41, 1807 (1963)), by reacting derivatives of 8-halopurines or 8-halopurineribonucleosides with thiourea (J. Am. Chem. Soc., 80, 6671 (1958), 86, 1242 (1964)), and by treating purine-1-N-oxide derivatives with thioacetic acid (J. Org. Chem., 29, 3209 (1964)). These known methods are not practical for industrial application because the starting materials are not readily available and because of low yields. 8-mercaptopurine and its derivatives can also be obtained by heating a mixture of purine or its derivatives with elementary sulfur to its melting point (J. Org. Chem., 29, 3209 (1964)), but this method cannot be applied to purines, which decompose at high temperature, for example 6-substituted purines, such as hypoxanthine and adenine, and 6-substituted purineribonucleosides.

SUMMARY OF THE INVENTION

It has now been found that 8-mercaptopurine derivatives are produced in high yield when purine derivatives, even those sensitive to heat, are reacted with elementary sulfur in a liquid medium essentially consisting of acetamide or N-lower alkylacetamides.

In its more specific aspects, the present invention resides in a method of producing an 8-mercaptopurine derivative by reacting elementary sulfur with a 6-substituted purine derivative having the formula

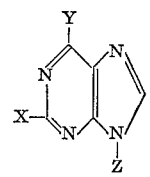

wherein X is hydrogen, $NH_2$, or $NHCOCH_3$, when X is hydrogen, Y is $NH_2$, OH, Cl, $OCH_3$ or $NHCH_2C_6H_5$ and Z is hydrogen or ribofuranosyl, of the hydroxyl groups in positions 2',3',5' of said ribofuranosyl, at least those in positions 2' and 3' being protected by acetyl or isopropylidene; and when X is $NH_2$ or $NHCOCH_3$, Y is OH and Z is acetyl or said ribofuranosyl, in a liquid medium essentially consisting of an acetamide of the formula

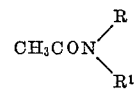

wherein R and R' are hydrogen or lower alkyl.

Representative examples of the 6-substituted purine derivatives employed as starting materials in the method of the invention are adenine, hypoxanthine, 6-chloropurine, 6-N-benzyladenine, 6-methoxypurine, 2-N-9(or 7)-N-diacetylguanine, 2',3',5'-tri-O-acetyladenosine, 2',3',5'-tri-O-acetylinosine, 2',3'-5'-tri-O-acetylguanosine, 2',3'-O-isopropylidene-adenosine, 2',3'-O-isopropylideneinosine and 2'3' - O - isopropylideneguanosine. Certain 6 - substituted purine derivatives not enumerated above, such as guanine, 2,6-dihydroxypurine (xanthine), 1,3-N-dimethylxanthine, 1,3,7-N-tri-methylxanthine and the like do not readily react with sulfur. When a 6-substituted purineribonucleoside in which the hydroxyl groups in positions 2',3' of the ribofuranosyl group are not protected is used as a starting compound, complex decomposition of the compound occurs and the desired product is not obtained.

The liquid medium of the reaction system may be acetamide or an N-lower alkylacetamide, such as N-monomethylacetamide, N,N-dimethylacetamide and N,N-diethylacetamide. N,N-dimethylacetamide usually gives the best result. The acetamides are employed in a large stoichiometric excess over the starting purine derivative and the sulfur, the use of 0.5–3.0 liters of the acetamide per mole of the purine derivative being desirable. It is believed that the acetamides not only act as solvents but have an additional specific effect. The reaction does not proceed in solvents such as dimethylformamide and other formamides, dimethyl sulfoxide, dimethyl propionamide and N,N-dimethylaniline, which are similar to N,N-dimethylacetamide in their solvent effect on the starting compounds.

An excess amount of sulfur, for instance, 5–20 moles per mole of the purine derivatives, is usually preferred.

The reaction is carried out by heating a mixture of purine derivative, sulfur and acetamide to temperatures of 100° C. or more. The boiling temperature (140° C.–200° C.) of the mixture is suitable, and refluxing provides convenient temperature control. Although the time required for completing the reaction varies with specific conditions, it is generally 2–20 hours.

The 8-mercaptopurine derivative produced normally corresponds to the starting compound, but there are some exceptions. 8-mercaptoadenine may be obtained from 6-N-benzyladenine by a secondary reaction with hydrogen sulfide formed in the reaction mixture. When 2′,3′-5′-tri-O-acetylinosine is employed as the starting material and aqueous ammonia is used in working up the reaction mixture, 8-mercaptoinosine is obtained by hydrolysis of the O-acetyl groups. The chlorine of 6-chloropurine is replaced by a mercapto group before the hydrogen in the 8-position. Therefore, 6-mercaptopurine may be obtained when the reaction is carried out under mild reaction conditions and terminated at an early stage.

The reaction product can be worked up by evaporating the acetamide and extracting the product from the residue with a suitable solvent, such as dilute hydrochloric acid, dilute alkali metal hydroxide solution, or methanol.

DESCRIPTION OF PREFERRED EMBODIMENTS

The following examples further illustrate the invention.

EXAMPLE 1

A mixture of 135 g. (1 mole) adenine, 256 g. (8 moles) sulfur and 1.5 liters N,N-dimethylacetamide was refluxed for 8 hours. After the reaction, the solvent was removed by vacuum distillation, and the residue was extracted with three 500 ml. batches of hot normal hydrochloric acid. The combined extracts were purified with activated carbon and concentrated in a vacuum to ⅓ of the original volume. On cooling with ice water, the crystals of 8-mercaptoadenine hydrochloride were precipitated. Amount: 159 g., yield: 75%. The melting point of the compound when purified by recrystallization from normal hydrochloric acid was above 300° C.

Elementary analysis (percent).—Calcd.

(for $C_5H_5N_5S \cdot HCl \cdot \frac{1}{2}H_2O$)

C, 28.24; H, 3.32; N, 32.93; S, 15.07. Found: C, 28.56; H, 3.40; N, 33.05; S, 15.37.

EXAMPLE 2

Mixtures of 13.5 g. (0.1 mole) adenine and 25.6 g. (0.8 mole) sulfur were refluxed respectively in 150 ml. of the solvents listed below for 15 hours. The reaction product was quantitatively analyzed for 8-mercaptoadenine by paper chromatography using a mixed solvent of propanol:conc. ammonium hydroxide solution:water= 20:12:3 (by vol.). The following yields were obtained.

| Solvent used: | Yield (percent) |
| --- | --- |
| Acetamide | 25 |
| N-monomethylacetamide | 57 |
| N,N-dimethylacetamide | 90 |
| N,N-diethylacetamide | 45 |

EXAMPLE 3

A mixture of 27.2 g. (0.2 mole) hypoxanthine, 128 g. (4 moles) sulfur and 400 ml. N,N-dimethylacetamide was refluxed for 25 hours. The solvent was removed by distillation, and the residue was extracted with 1 normal aqueous sodium hydroxide solution until the residue was free from any substance showing ultraviolet absorption. The yellowish-brown crystals formed by acidifying the extract with acetic acid were filtered off, washed with water, extracted with hot 1 normal hydrochloric acid to remove contaminants, and the residue consisted of hypoxanthine crystals. Amount: 21.7 g., yield: 65%. The melting point of the faint yellow crystals obtained by reprecipitation from conc. ammonium hydroxide solution and acetic acid was above 360° C. (decomp.).

Elementary analysis (percent).—Calcd.

(for $C_5H_4N_4OS$):

C, 35.71; H, 2.40; N, 33.32; S, 19.07. Found: C, 35.15; H, 2.50; N, 32.99; S, 19.06.

EXAMPLE 4

A mixture of 30.8 g. (0.2 mole) 6-chloropurine, 64 g. (2 moles) sulfur, and 300 ml. dimethylacetamide was heated to 140° C. for 15 hours. After the reaction, the solvent was removed by vacuum distillation, and the residue extracted with about 100 ml. 0.5 normal hydrochloric acid to remove contaminants. After washing with water, the residue was extracted with about 200 ml. 1 normal, aqueous sodium hydroxide solution. When the extract was acidified with acetic acid, 6,8-dimercaptopurine was crystallized. Amount: 17.0 g., yield: 46%. The melting point of the faint yellow crystals obtained by reprecipitation as in Example 3 was above 300° C.

Elementary analysis (percent).—Calcd.

(for $C_5H_4N_4S_2$):

C, 32.59; H, 2.19; N, 30.41; S, 34.81. Found: C, 32.58; H, 2.18; N, 30.43; S, 35.06.

EXAMPLE 5

A mixture of 7.5 g. (0.05 mole) 6-methoxypurine, 12.8 g. (0.4 mole) sulfur, and 75 ml. N,N-dimethylacetamide was refluxed for 8 hours. After the solvent was removed by vacuum distillation, the residue was dissolved in 100 ml. 1 normal aqueous sodium hydroxide solution, and undissolved sulfur was removed. On acidifying the solution with 1 normal hydrochloric acid, a brown precipitate was formed and was purified by reprecipitation as in Example 3. 3.61 g. of faintly yellow crystals of 8-mercaptohypoxanthine were obtained. Yield: 43%. The crystals showed the same Rf value in paper chromatography, ultraviolet and infrared spectra as the 8-mercaptohypoxanthine obtained in Example 3.

EXAMPLE 6

A mixture of 45 g. (0.2 mole) 6-N-benzyladenine (6-benzylaminopurine), 64 g. (2 moles) sulfur, and 400 ml. dimethylacetamide was kept at 145° C. for 6 hours. After the reaction, the solvent was distilled off, and the residue was extracted with three 100 ml. batches of 1 normal sodium hydroxide solution. The extract was adjusted to pH 6.5 with acetic acid and was cooled with ice-water. The crystals formed were filtered off, washed with water, and extracted with hot 1 normal hydrochloric acid to remove contaminants. They then consisted of 6-N-benzyl-8-mercaptoadenine. Amount: 17.6 g., yield: 34%. The melting point of the pure crystals recrystallized from aqueous ethanol (50% by vol.) was 281–2° C. (decomp.).

Elementary analysis (percent).—Calculated (for $C_{12}H_{11}N_5S$): C, 56.01; H, 4.31; N, 27.22; S, 12.46. Found: C, 56.36; H, 4.24; N, 27.33; S, 12.61.

Ultraviolet absorption maxima:

$\lambda_{max}^{pH\,1}$ 245, 318 m$\mu$ $\lambda_{max}^{pH\,11}$ 235, 309 m$\mu$

EXAMPLE 7

A mixture of 11.8 g. (0.03 mole) 2′,3′,5′-tri-O-acetyladenosine, 14.3 g. (0.45 mole) sulfur, and 60 ml. N,N-dimethylacetamide was refluxed for 4.5 hours. After the reaction, the solvent was distilled off, and the residue was extracted with three 200 ml. batches of hot methanol. The extract was evaporated to dryness in a vacuum, and about 100 ml. 7 normal ammonium hydroxide solution were added to the residue. The mixture was left to stand overnight and was then concentrated in a vacuum. When the concentrate was adjusted to pH 6 with hydrochloric acid, 8-mercaptoadenosine crystallized. Amount: 3.95 g., yield: 44%. The melting point of the pure material recrystallized from hot water after treatment with active carbon was 175° C. (decomp.; softening from 165° C.).

Elementary analysis (percent).—Calculated (for $C_{10}H_{13}N_5O_4S$): C, 40.13; H, 4.38; N, 23.40; S, 10.71. Found: C, 39.88; H, 4.46; N, 23.29; S, 10.79.

EXAMPLE 8

A mixture of 118.2 g. (0.3 mole) 2′,3′,5′-tri-O-acetyl-inosine, 144 g. (4.5 moles) sulfur, and 600 ml. N,N-dimethylacetamide was refluxed for 8 hours. After the reaction, the solvent was distilled off, and the residue was extracted with three 300 ml. batches of hot methanol, leaving a residue of 61 g. sulfur. The extract was evaporated to dryness in a vacuum, 400 ml. 7 normal ammonium hydroxide solution were added to the residue, and the mixture was left to stand overnight. After ammonia and water were removed from the mixture by distillation, the residue was dissolved in about 300 ml. water, and the solution was adjusted to pH 5 with hydrochloric acid. On cooling with ice-water, crystals of 8-mercaptoinosine were formed. The crystals were separated by filtration, washed sequentially with water, ethanol, and ether to remove colored contaminants adhering to the crystals, and 48 g. brown crude crystals were obtained. The combined mother liquor, water and ethanol washings were adjusted to pH 2 with hydrochloric acid, and contacted with a decoloring resin prepared by condensation polymerization of m-phenylenediamine, resorcinol and formaldehyde. After the resin was washed with water, the product adsorbed on the resin was eluted with 0.2 normal ammonium hydroxide solution. The eluate fractions showing strong ultraviolet absorption were gathered and concentrated in a vacuum. When the pH of the concentrate was adjusted to 5 with hydrochloric acid, additional 9.2 g. of 8-mercaptoinosine crystals were obtained for a total yield of 64%. The melting point of the needle-shaped crystals obtained by recrystallization from hot water was 244–5° C. (decomp.).

Elementary analysis (percent).—Calculated (for $C_{10}H_{12}N_4O_5S$): C, 40.00; H, 4.03; N, 18.66; S, 10.68. Found: C, 40.09; H, 4.17; N, 18.83; S, 10.82.

EXAMPLE 9

A mixture of 15.4 g. (0.05 mole) 2′,3′-O-isopropylideneadonosine, 16 g. (0.5 mole) sulfur, and 100 ml. N,N-dimethylacetamide was refluxed for 5 hours. After removal of the solvent by distillation, the residue was extracted three times with 200 ml. methanol, the combined extracts were contacted with about 350 ml. active alumina, and the product adsorbed on the alumina was eluted with methanol. The eluate fractions strongly absorbing ultraviolet were evaporated to dryness in a vacuum, the residue was dissolved in 200 ml. 0.5 normal aqueous sodium hydroxide solution, and the solution was extracted with chloroform to remove contaminants.

When the water layer was adjusted to pH 6 and cooled with ice-water, needle-shaped crystals of 2′,3′-O-isopropylidene-8-mercaptoadenosine were formed in an amount of 11.5 g. Yield: 68%. The melting point of the compound when recrystallized from acetone containing approximately 2–5% water by volume was 175–7° C.

Elementary analysis (percent).—Calculated (for $C_{13}H_{17}N_5O_4S$): C, 44.06; H, 5.05; N, 20.64; S, 9.45. Found: C, 45.70; H, 5.46; N, 20.67; S, 9.58.

EXAMPLE 10

A mixture of 30.8 g. (0.1 mole) 2′,3′-O-isopropylideneinosine, 64 g. (2 moles) sulfur, and 200 ml. N,N-dimethylacetamide was refluxed for 15 hours. The reaction mixture was evaporated to dryness in a vacuum, and the residue was extracted with 300 ml. hot methanol. When worked up as described in Example 9, the extract yielded 20.4 g. crude 2′,3′-O-isopropylideneinosine. Yield: 60%.

Elementary analysis (percent).—Calculated (for $C_{13}H_{16}O_5N_4S$): C, 45.87; H, 4.74; N, 16.46; S, 9.42. Found: C, 45.98; H, 4.56; N, 16.65; S, 9.45.

EXAMPLE 11

A mixture of 4.09 g. (0.01 mole) 2′,3′,5′-tri-O-acetyl-guanosine, 3.2 g. (0.1 mole) sulfur, and 20 ml. N,N-dimethylacetamide was refluxed for 10 hours. The reaction mixture was evaporated to dryness, and 100 ml. 0.5 normal aqueous sodium hydroxide solution were added to the residue. After standing overnight, the mixture was filtered, and the filtrate was adjusted to pH 6 with acetic acid to precipitate crystals which were recovered by filtration. When recrystallized repeatedly from hot water, the crude 8-mercaptoguanosine was colored a faint yellow and weighed 1.04 g. Yield: 33%. Crystals further recrystallized from hot water had a melting point above 220° C.

Elementary analysis (percent).—Calculated (for $C_{10}H_{13}O_5N_5S$): C, 38.09; H, 4.16; N, 22.21; S, 10.17. Found: C, 38.21; H, 4.30; N, 22.15; S, 10.19.

2-N-9-N-diacetylguanine and 2-N-7-N-diacetylguanine are converted to the corresponding 8-mercapto derivatives in a reaction analogous to that of Example 3, and 2′,3′-O-isopropylideneguanosine is capable of a corresponding conversion under the conditions of Example 10.

What is claimed is:
1. A method of producing an 8-mercaptopurine derivative which comprises:
(a) reacting elementary sulfur with a 6-substituted purine derivative of the formula

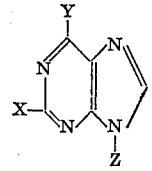

wherein X is hydrogen, $NH_2$, or $NHCOOCH_3$;
when X is hydrogen, Y is $NH_2$, OH, Cl, $OCH_3$, or $NHCH_2C_6H_5$, and Z is hydrogen or ribofuranosyl containing hydroxyl groups in positions 2′, 3′, and 5′ and at least those in positions 2′ and 3′ being protected by acetyl or isopropylidene;
when X is $NH_2$ or $NHCOCH_3$, Y is OH, and Z is acetyl or said ribofuranosyl; in a liquid medium essentially consisting of an acetamide of the formula

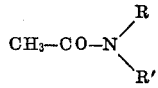

wherein R and R′ are hydrogen or lower alkyl; and
(b) recovering the 8-mercaptopurine from the reaction mixture.

2. A method as set forth in claim 1, wherein said lower alkyl is methyl or ethyl.

3. A method as set forth in claim 1, wherein R and R′ are methyl.

4. A method as set forth in claim 1, wherein said 6-substituted purine derivative is reacted with said sulfur at a temperature above 100° C.

5. A method as set forth in claim 4, wherein said temperature is the boiling temperature of said medium.

6. A method as set forth in claim 4, wherein said temperature is between 140 and 200° C.

7. A method as set forth in claim 6, wherein the amount of said sulfur is between 5 and 20 moles per mole of said 6-substituted purine derivative.

8. A method as set forth in claim 7, wherein the amount of said acetamide is between 0.5 and 3.0 liters per mole of said 6-substituted purine derivative.

References Cited

UNITED STATES PATENTS 2,500,142  3/1950  Wiesehahn ---------- 260—252

OTHER REFERENCES

Wiebe et al.: "Chem. Abst.," vol. 62, 1965, p. 14473 (c).

Gunning et al.: "Advances in Photochemistry," vol. 4, 1966, pp. 150–153 and 167–173.

LEWIS GOTTS, Primary Examiner

JOHNNIE R. BROWN, Assistant Examiner

U.S. Cl. X.R.

260—252, 254